US008477636B2

(12) United States Patent
Talagery

(10) Patent No.: US 8,477,636 B2
(45) Date of Patent: Jul. 2, 2013

(54) METHOD AND SYSTEM FOR PROVIDING UPDATES ON ACCESS NETWORK CAPABILITY IN AN IP MULTIMEDIA SYSTEM NETWORK

(75) Inventor: Gautam Talagery, Allen, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/375,286

(22) PCT Filed: Jul. 26, 2007

(86) PCT No.: PCT/IB2007/002132
§ 371 (c)(1),
(2), (4) Date: Jan. 27, 2009

(87) PCT Pub. No.: WO2008/012659
PCT Pub. Date: Jan. 31, 2008

(65) Prior Publication Data
US 2010/0014436 A1    Jan. 21, 2010

Related U.S. Application Data

(60) Provisional application No. 60/820,699, filed on Jul. 28, 2006.

(51) Int. Cl.
*H04L 1/00* (2006.01)
*H04L 12/66* (2006.01)
(52) U.S. Cl.
USPC ............ 370/250; 370/236; 370/352; 370/401

(58) Field of Classification Search
USPC ................. 370/260, 390, 432, 408, 392, 250, 370/352, 389, 351, 356
See application file for complete search history.

(56) References Cited

U.S. PATENT DOCUMENTS

| 6,871,070 | B2 * | 3/2005 | Ejzak ......................... 455/435.1 |
| 7,478,424 | B2 * | 1/2009 | Mester et al. .................... 726/11 |
| 2004/0052259 | A1 * | 3/2004 | Garcia et al. ................... 370/392 |
| 2005/0226174 | A1 * | 10/2005 | Kiss .............................. 370/282 |
| 2006/0115074 | A1 * | 6/2006 | Hollatz et al. ........... 379/265.09 |
| 2006/0233100 | A1 * | 10/2006 | Luft et al. ...................... 370/229 |
| 2006/0271693 | A1 * | 11/2006 | Thiebaut et al. .............. 709/229 |
| 2007/0189279 | A1 * | 8/2007 | Thalanany et al. ........... 370/356 |

OTHER PUBLICATIONS

Garcia-Martin, Private Header (P-Header) Extensions to the Session Initiation Protocol (SIP) for the 3$^{rd}$-Generation Partnership Project (3GPP, Jan. 2003, IETF, XP015009238.*

(Continued)

*Primary Examiner* — Kevin C Harper
*Assistant Examiner* — Samina Choudhry

(57) ABSTRACT

Updates on access network capability are provided to an IP Multimedia System (IMS) network. A User Equipment (UE) that is connected to the access network initiates a communication session with the IMS network by sending a Session Initiation Protocol (SIP) registration request to the IMS network. The SIP registration request from the UE includes a P-Access-Network-Info (PANI) header or an Open Mobile Alliance (OMA) header, having a tag that includes current information regarding one or more capabilities of the access network to which the UE is currently connected. A triggering event, e.g., a change in Quality of Service, signals the IMS network to modulate service provisions in the IMS network according to the information concerning the access network capabilities that were provided in the PANI header.

22 Claims, 5 Drawing Sheets

OTHER PUBLICATIONS

Garcia-Martin Ericsson E Henrikson Lucent D Mills Vodafone M: "Private Header (P-Header) Extensions to the Session Initiation Protocol (SIP) for the $3^{rd}$-Generation Partnership Project (3GPP); rfc3455.txt" IETF Standard, Internet Engineering Task Force, IETF, CH, Jan. 1, 2003.

Duncan Mills Vodafone: "Private Session Initiation Protocol Extension for Access Network Information; draft-mills-sip-access-network-info-03.txt" IETF Standard-Working-Draft, Itnernet Engineering Task Force, IETF, CH, No. 3. Jun. 1, 2002.

"Digital cellular telecommunications system (Phase 2+); Universal Mobile Telecommunications System (UMTS); Internet Protocol (IP) multimedia call control protocol based on Session Initiation Protocol (SIP) and Session Description Protocol (SDP); Stage 3 (3GPP TS 24.229 version 7.4.0 Release 7); ETSI" ETSI Standards, LIS, vol. 3-CN1, No. V7.4.0, Jun. 1, 2006.

Mani M et al: "New QoS control mechanism based on extension to sip for access to UMTS core network via different kinds of access networks" Wireless and Mobile Computing Networking and Communications, 2005. (W IMOB'2005), IEEE International Conference on Montreal, Canada Aug. 22-24, 2005, Piscataway, NJ, USA, IEEE, vol. 2, Aug. 22, 2005, pp. 150-157.

* cited by examiner

METHOD AND SYSTEM FOR PROVIDING UPDATES ON ACCESS NETWORK CAPABILITY IN AN IP MULTIMEDIA SYSTEM NETWORK

CROSS-REFERENCE TO RELATED APPLICATIONS

This application claims the benefit of U.S. Provisional Application No. 60/820,699, filed Jul. 28, 2006, the disclosure of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to a telecommunication network. More particularly, and not by way of limitation, the present invention is directed to a system and method for providing updates on access capability in an IMS network.

PRIOR ART AND PROBLEMS

IMS devices connect to a IP based network and establish sessions with one another and with an IMS network of nodes. These IMS devices may be wireless or otherwise and connected to the IMS network through one of a multitude of access mediums (e.g. GPRS, EDGE, UMTS, WiFi, WiMAX etc.), each of which have their own capabilities.

This network of nodes can include a 'Presence Server' that tracks the availability and other status of a particular user (User-A) operating an IMS device (IMS device UE-A). The status of User-A can also be tracked by multiple users, one of whom may be User-B (UE-B).

IMS provides a set of IP based services, so the capabilities of the access medium can be used to optimize these IP based services. The type of access medium is carried in eXtensible Markup Language (XML) files or Session Initiation Protocol (SIP) message headers. However, a mechanism for providing updates to the IMS network on access capabilities and the criteria for providing the updates to the IMS network are not addressed in the current standards and equipment implementations.

There are prior art references which discuss sending access network information to other nodes. "Private Header (P-Header) Extensions to the Session Initiation Protocol (SIP) for the $3^{rd}$-Generation Partnership Project (3GPP); rfc3455.txt" by M. Garcia-Martin et al. discloses sending a SIP extension header with an access configuration information. "Private Session Initiation Protocol Extension for Access Network Information; draft-mills-sip-access-network-info-03.txt" by Duncan Mills also discloses sending static access configuration information in a header. Furthermore, 3GPP TS 24.229 version 7.4.0 Release 7 entitled "Digital Cellular telecommunications system (Phase 2+); Universal Mobile Telecommunications System (UMTS); Internet Protocol (IP) multimedia call control protocol based on Session Initiation Protocol (SIP) and Session Description Protocol (SDP); Stage 3; ETSI" discloses some information on sending information related to the access network. In addition, "New QoS control mechanism based on extension to sip for access to UMTS core network via different kinds of access networks" by Mani et al. and WO 2004/086722 both discuss the transmission of information related to the access network. However, none of these references disclose sending current performance information about the access network to the IMS network.

It would be advantageous to have a system and method for providing updates an access system capabilities to overcome, the disadvantages of the prior art.

BRIEF SUMMARY OF THE INVENTION

The present invention discloses an IMS user providing current capabilities of an access medium to the IMS network. Among other capabilities, bandwidth, recorded latency over the access medium, past and upcoming interruptions (e.g., the UE changing cells) in data flow from the access medium can be provided. Various triggers for providing-updates to the IMS include a change in Quality of Service within the access network and between access networks, an occurrence of an interruption and an operator chosen percentage of the average bandwidth measured within and between access networks. The bandwidth percentage change is averaged over an operator chosen period of time.

In one aspect, the present invention is directed to a method of providing an update on access network capability to an IP Multimedia System (IMS) network. The method comprises the steps of a User Equipment (UE) that is connected to the access network, sending a Session Initiation Protocol (SIP) registration request to the IMS network. The SIP registration request includes a P-Access-Network-Info header having a tag that provides current information regarding capabilities of the access network. In response to a triggering event, the IMS network modulates service provisions according to the information regarding the capability of the access network available in the tag.

The capabilities addressed by the tag can include the bandwidth availability of the access network, the recorded latency across the access network and data flow interruption towards the IMS network.

In another aspect, the present invention is directed to a system for providing updates on access network capability to an IP Multimedia System (IMS) network. The method comprises the steps of a User Equipment (UE) that is connected to the access network, sending a Session Initiation Protocol (SIP) registration request to the IMS network. The SIP registration request includes a P-Access-Network-Info header having a tag that provides current information regarding capabilities of the access network. In response to a triggering event, the IMS network modulates service provisions according to the information regarding the capability of the access network available in the tag.

The capabilities addressed by the tag can include the bandwidth availability of the access network, the recorded latency across the access network and data flow interruption towards the IMS network.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 1:
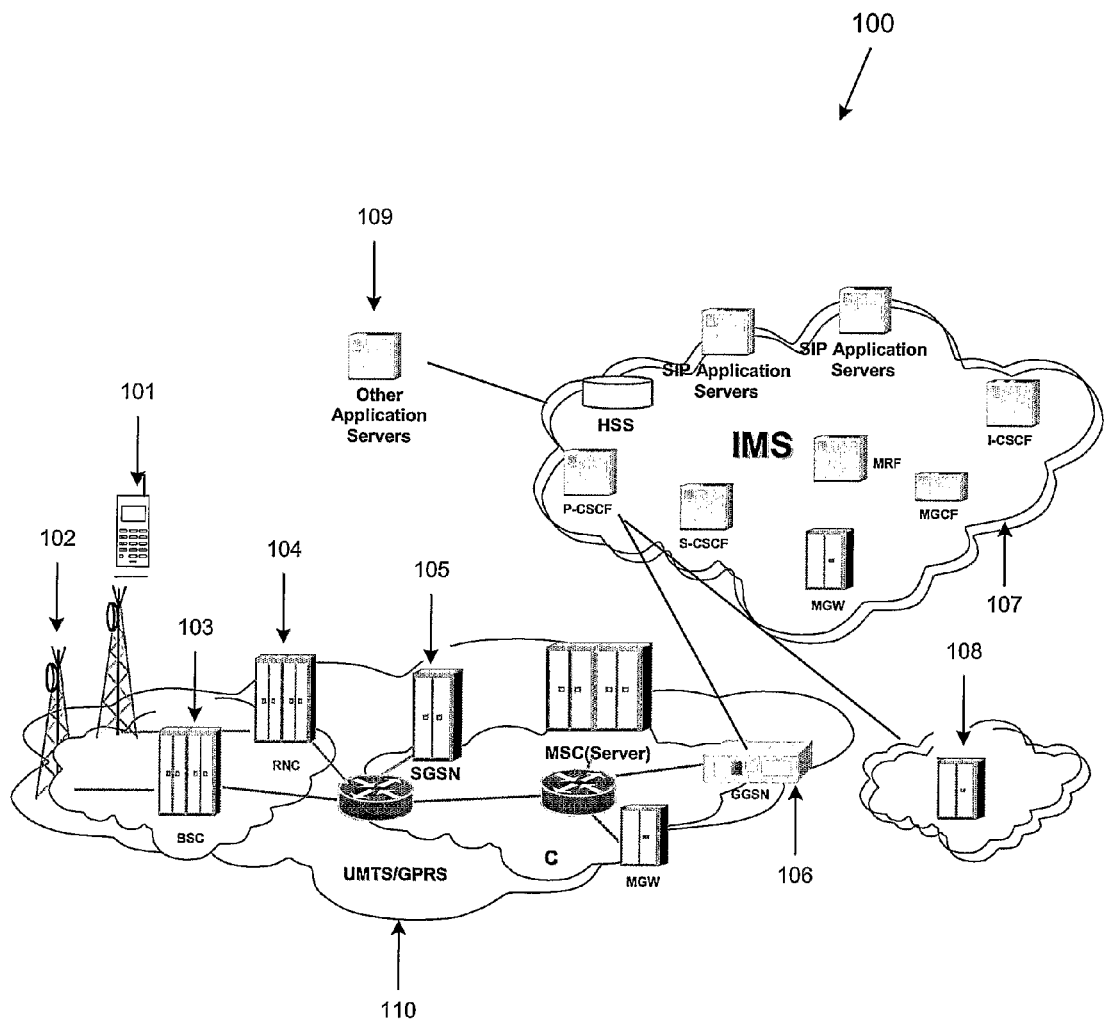
FIG. 1 depicts the architecture of the IMS network in accordance with an embodiment of the present invention.

FIG. 1 depicts the architecture of an IMS network in which an embodiment of the present invention may be implemented. IMS user 101 connects to IMS network 107 through one of various types of wireless access 102, 103, 104, 105, 106 or other access 108. IMS network 107 is a non exhaustive listing of nodes that connect to access network 110 through GGSN 106 (for wireless access) or router 108 for other accesses. Application servers are used by IMS network 107 to provide services to IMS user 101. Other application servers 109 may be external to the access network and the IMS network.

Figure 2:
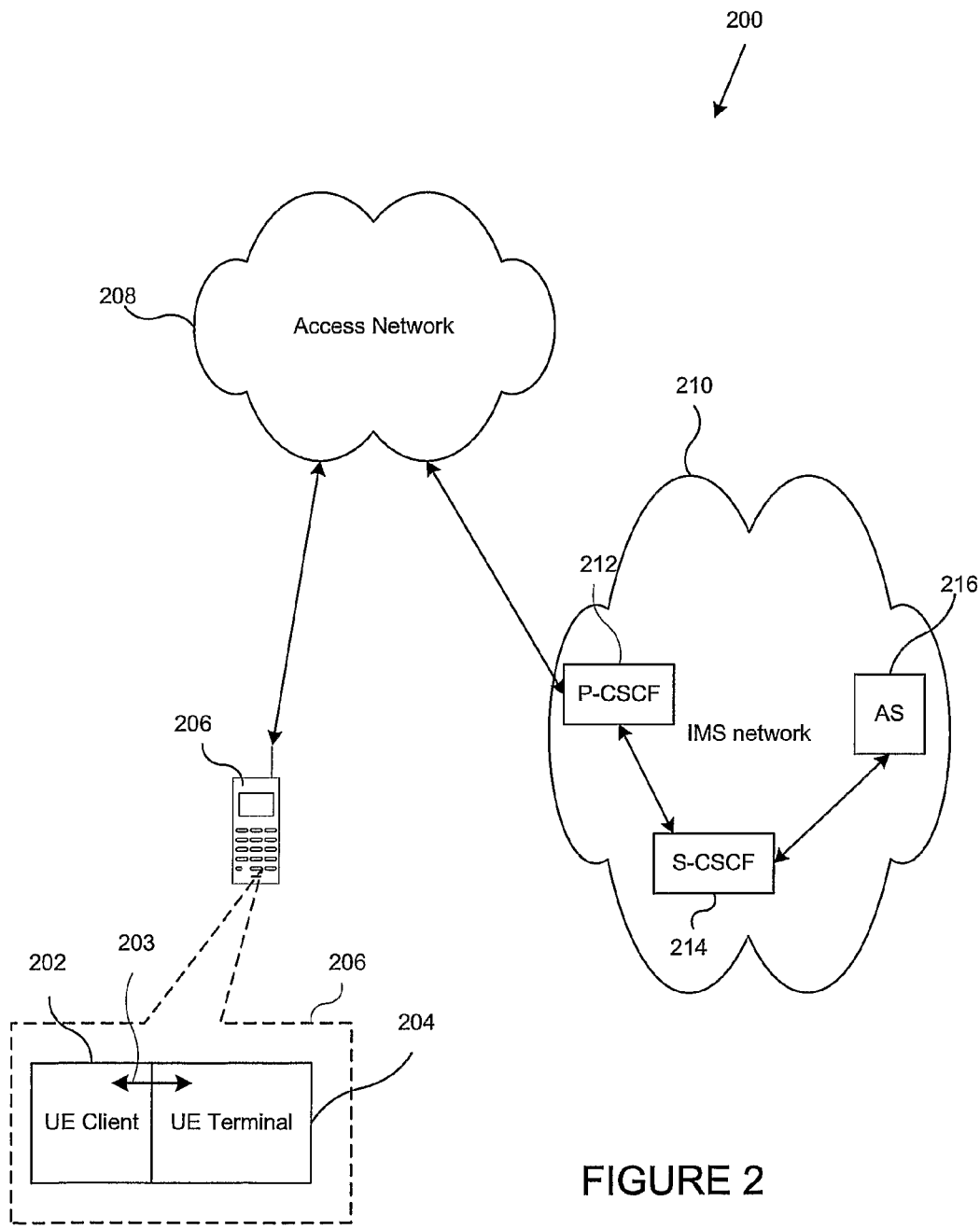
FIG. 2 is a high-level block diagram of the implementation of a method for providing current access network capabilities to an IMS network in accordance with an embodiment of the present invention.

FIG. 2 is a high-level block diagram of the implementation of a method for providing current access network capabilities to an IMS network in accordance with an embodiment of the present invention. Wireless terminal 206, which is connected to Access Network 208, begins the process of connecting to IMS network 210. If wireless terminal 206 is first connecting to IMS network 210, current access network capabilities are included in the SIP header of an SIP registration request message. The SIP request is routed through access network 208 to P-CSCF 212 in the IMS network. The information regarding the access network capabilities is retrieved from the SIP header by Serving-CSCF 214 and sent to Application Server (AS) 216. AS 216 then uses the capabilities to adjust/modulate the services to accommodate wireless terminal 206. Wireless terminal 206 includes UEclient 202 and UETerminal 204. UEClient 202 determines access capabilities from UEterminal 204 and based on the results, populates a message to IMS network 210 (e.g., the REGISTER message) with a P-Access Network Information (PANI) header included. The PANI header includes new extensions that indicate the access network capabilities, which may include bandwidth, roundtrip time in the access network (accessrtt) and interruption (all the extensions are more fully explained below). In the situation where wireless terminal 206 is already connected to IMS network 210, wireless terminal 206 sends a message to the Proxy-Call Session Control Function (P-CSCF) in which current access network 208 capabilities have been inserted in the SIP message header (not shown).

The purpose of this access network capability information is to allow the IMS network to modulate services based on capabilities in the access network. The access capabilities can be transmitted to the IMS by: 1) P-Access-Network-Information (PANI) header: a SIP header that is carried in all SIP messages except CANCEL and ACK messages and 2) utilizing OMA defined XML: within the Open Mobile Alliance (OMA) defined XML <device> element, as child to <network-availability> or its child <network>.

An SIP User Agent (UA) can use a PANI header to relay information about the access network technology to proxies that are providing services. A serving proxy may then use this information to optimize services for the UA. A non exhaustive list of individual capabilities that can be transmitted includes the following:

bandwidth capabilities on the access;

average (roundtrip time) RTT over the access; and an approximate period of upcoming or past interruption in data flow from access towards the IMS.

The XML in OMA-XDM is defined as a tree with each level having attributes and sub-trees. Access capability can be carried in one of three ways: <device>, <network availability> and <network> as demonstrated in the tree below.

```
<device>
|-----<attribute 1>
|-----<attribute 2>
|------<accessrtt=50ms>
|-----<network availability >
      |------<attribute ..>
      |------<interruption=200ms>
      |------<network>
            |----<attribute ..>
            |----<attribute..>
            |------<bandwidth=384kbps>.
```

Access network capabilities are provided to the IMS network as follows:

Bandwidth capabilities can be carried in a new extension to the SIP header P-Access-Network-Info bandwidth=<data rate in bits/s>

Bandwidth capabilities can also be carried as a new tag under the device element, or sub-element, when this information is relayed in an xml body:

bandwidth=<data rate in bits/s>.

For example, the IMS network can push only essential data to the IMS user in a slow network, but push all data in a fast network.

Average RTT over the access can be carried in a new extension to the SIP header P-Access-Network-Information:

accessrtt=<average RTT in ms>

Average RTT can also be carried as a new tag under the device element or sub-element when this information is relayed in an xml body:

accessrtt=<average RTT in ms>.

For example, the IMS network can change message retry mechanisms based on the RTT delays within the network.

Approximate period of interruption in data flow from access towards IMS can be carried in a new extension to the SIP header P-Access-Network-Information:

interruption=<interruption in ms>.

A positive value denotes an expected interruption. A negative value denotes a past interruption. A zero value is ignored. The approximate period can also be carried as a new tag under the device element or sub-element when this information is relayed in an xml body:

interruption=<interruption in ms>.

A positive value denotes an expected interruption. A negative value denotes a past interruption. A zero value is ignored. For example, in case of an expected interruption, the IMS network can wait for the specified time before providing further services. In case of a past interruption, the IMS network can retry services provided during the past interruption.

Triggers for the provision of updates of access capabilities towards the IMS include:
- a change in QoS, e.g., a UE changes positions within and between access networks;
- an operator chosen percentage change being detected in a specific capability within and between access networks. This percentage change in the specific capability is detected due to averaging over an operator chosen period of time (global or per each capability); and
- an interruption event in the connection to the access network, including historical (e.g., interruptions caused prior to accessing the IMS network) and future interruptions (e.g., a terminal anticipating movement between cells) and interruption in service (e.g., a terminal enters a tunnel and signal is lost temporarily).

Prior to accessing an IMS network, the IMS user is granted a Quality of Service (QoS) for use on the access network. In a mobility scenario, as the user moves between accesses, the QoS may change due to varying capabilities between accesses. Within an access network, the QoS may change based on capabilities of the access network.

Access capabilities are sent by the access network to the IMS network at the first instance of communication with the IMS network after the QoS has been established. At every subsequent change in QoS, the access network will update the IMS network with the changed access capabilities.

The absolute values of the access capabilities outlined above change almost continuously due to the nature of access networks. Therefore, it is inefficient for the IMS user to update the IMS network at every change in access capabilities. However, this problem can be overcome by identifying a threshold for the degree of change in access capabilities before the IMS user updates the IMS network. This threshold, specified in terms of percentage change in access capability, can be specified either on a per access capability basis, or as a global value applying to all access capabilities.

Due to the nature of access networks, access capabilities at a given place for a user tend to oscillate around a mean value when averaged over a period of time. Therefore, it is efficient for the IMS user to send access capability updates to the IMS network only if averaging over time shows that the specific access capability has changed. The percentage change in access capability, specified in the section above, to trigger an update is averaged over a period of time. This period of time can be specified either on a per access capability basis, or as a global value applying to all access capabilities. Occurrence of an interruption can also trigger an insertion of access capabilities in a message that is then transmitted to the IMS network.

Figure 3A:
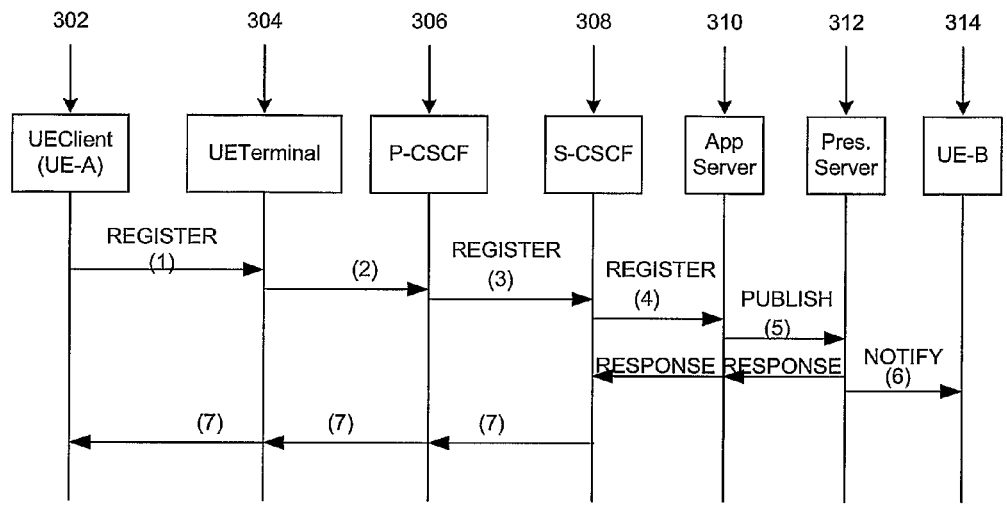
FIG. 3a illustrates a signal flow diagram at power up of a UE, in an embodiment of the present invention.

FIG. 3a illustrates signal flow at power-up of UE-A, utilizing a PANI header in an embodiment of the present invention. At power-up of the user's phone, UEclient 302 determines the UE access network capabilities from UEterminal 304. UEclient 302 is adapted to then populate a REGISTER message (1) with the PANI header having network access capabilities inserted that include one or more of the following capabilities extensions: bandwidth, accessrtt, and interruption.

P-CSCF 306 receives the REGISTER message (2) and passes the REGISTER message (3) on towards S-CSCF 308. S-CSCF 308 forwards (4) the REGISTER message to Application Server (AS) 310 that is monitoring subscriber registrations. The REGISTER message is also sent to Presence Server 312 which then forwards the REGISTER message to called terminal, UE-B 314. S-CSCF 308 responds to P-CSCF 306 by acknowledging processing of the REGISTER message (5) which is then passed through to UEclient 302.

Figure 3B:
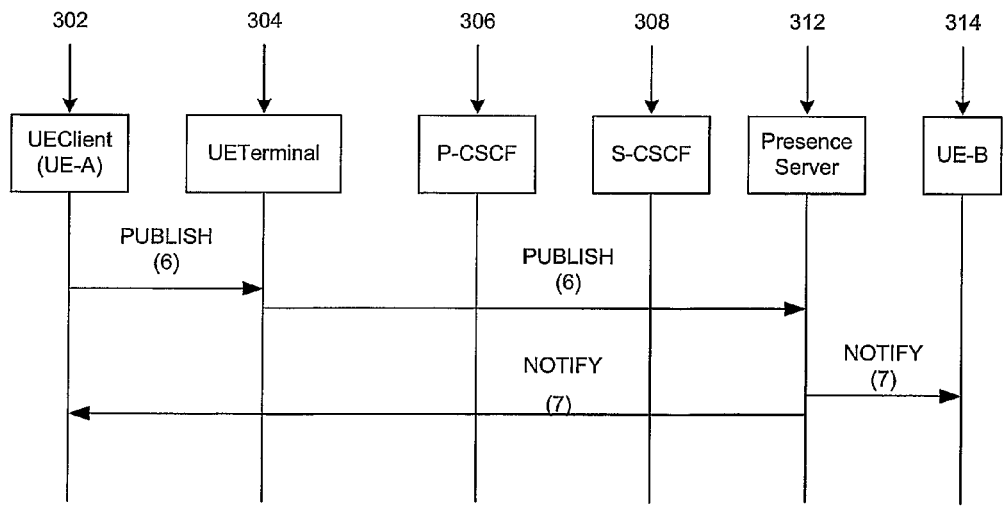
FIG. 3b depicts signal flow at power up of a UE using an OMA method of notifying the IMS of the access network capabilities in accordance with an embodiment of the present invention.

FIG. 3b depicts signal flow at power up of UE-A using an OMA method of notifying the IMS of the access network capabilities in accordance with an embodiment of the present invention. UEclient 302 populates a PUBLISH message (6) with an OMA based xml file that includes one or more of UE-A network access capabilities (e.g., bandwidth, accessrtt and interruption). UEclient 302 directs UEterminal 304 to send PUBLISH message (6) to Presence Server 312. Presence Server 312 and associated nodes record the new access capabilities for notifying other subscribers interested in the subscriber's access capabilities and presence in the IMS network. Presence Server 312 then sends a NOTIFY message (7) to interested, or listed, UEclients, including UE-B 314, assuming these UEclients are interested in access capabilities of UEclient 302 before initiating a call.

UEclient 302 receives NOTIFY messages (7) from Presence Server 312 with the new access capabilities of all users whose presence UEclient 302 has subscribed to. UEclient 302 responds (8) to Presence server 312 after recording the new access capabilities of the subscribed users into its Presence display client (not shown).

Figure 3C:
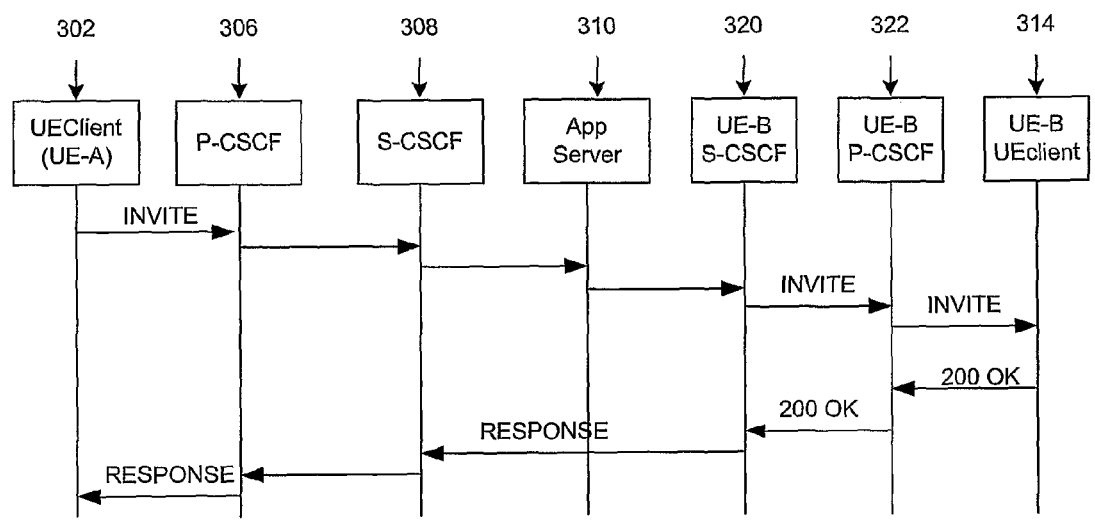
FIG. 3c is a signal flow diagram in an originating Call Setup in accordance with an embodiment of the present invention.

FIG. 3c illustrates signal flow in an originating Call Setup in accordance with an embodiment of the present invention. UEclient 302 determines if the UE-B's capabilities are adequate for call setup. If so, UEclient 302 populates an INVITE message with the new access capabilities and sends it to the UEclient 302 P-CSCF for forwarding towards UE-A (Caller) S-CSCF 308. UE-A SCSCF 308 invokes AS 310 for monitoring and provision of mid-call services, and forwards the new access capabilities to AS 310.

UE-A terminal's S-CSCF 308 forwards the INVITE message to UE-B terminal's S-CSCF 320. UE-B S-CSCF 320 invokes AS 310 to inform it of the call being setup. UE-B's AS (not shown) loads access capabilities previously received from UE-B UEclient 314. The UE-B's SCSCF forwards the INVITE to the UE-B P-CSCF, wherein the UE-B P-CSCF forwards the INVITE to UE-B's UEclient. The UE-B UEclient sends the latest access capabilities in a "200 OK" response to the UE-B's PCSCF which is forwarded to the UE-B SCSCF. The UE-B's SCSCF updates the UE-B's AS (not shown) with the UE-B UEclient's access capabilities and forwards a response to UE-A UEclient via UE-A SCSCF and UE-A PCSCF.

Figure 3D:
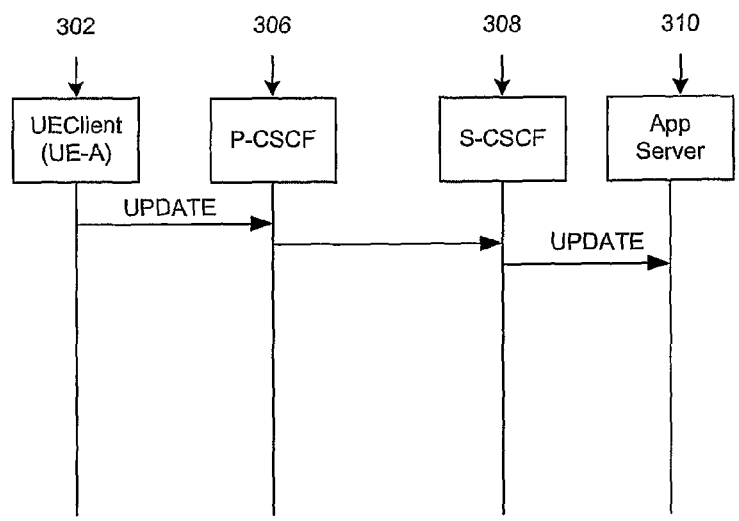
FIG. 3d depicts a signal flow diagram of a call in progress when a Caller moves into an area of capabilities different from the capabilities originally sent to the IMS according to an embodiment of the present invention.

FIG. 3d depicts signal flow when UE-A moves into an area of capabilities different from the capabilities originally sent to the IMS according to an embodiment of the present invention. During the middle of a call the UE-A may move into an area of access capabilities that are different from the originating area. The UE-A UEclient populates an UPDATE or INVITE message with the new access capabilities within the PANI header. The UE-A AS receives the information via UE-A PCSCF and UE-A SCSCF and updates the AS records. Optionally, modulated services can be provided during the call at a rate more aligned with the modified access capabilities.

Figure 3E:
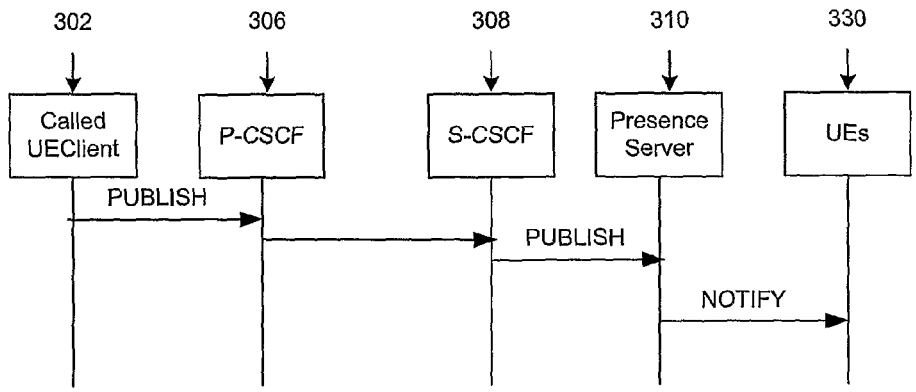
FIG. 3e depicts a signal flow diagram of a steady state when there is either no call in progress or a call in progress, according to an embodiment of the present invention.

FIG. 3e illustrates signal flow when the "UE-B" when UE-A moves into an area of capabilities different from the capabilities originally sent to the IMS, according to an embodiment of the present invention. UE-A UEclient updates the Presence Server with new access capabilities using the OMA XML format in a update PUBLISH message. The Presence Server updates all interested UEs with UE-A's new access capabilities using a NOTIFY message. The UE-B UEclient receives updated capabilities in a NOTIFY message and modifies handling of provided services to a rate better aligned with the new access capabilities of the UE-A UEclient.

Figure 4:
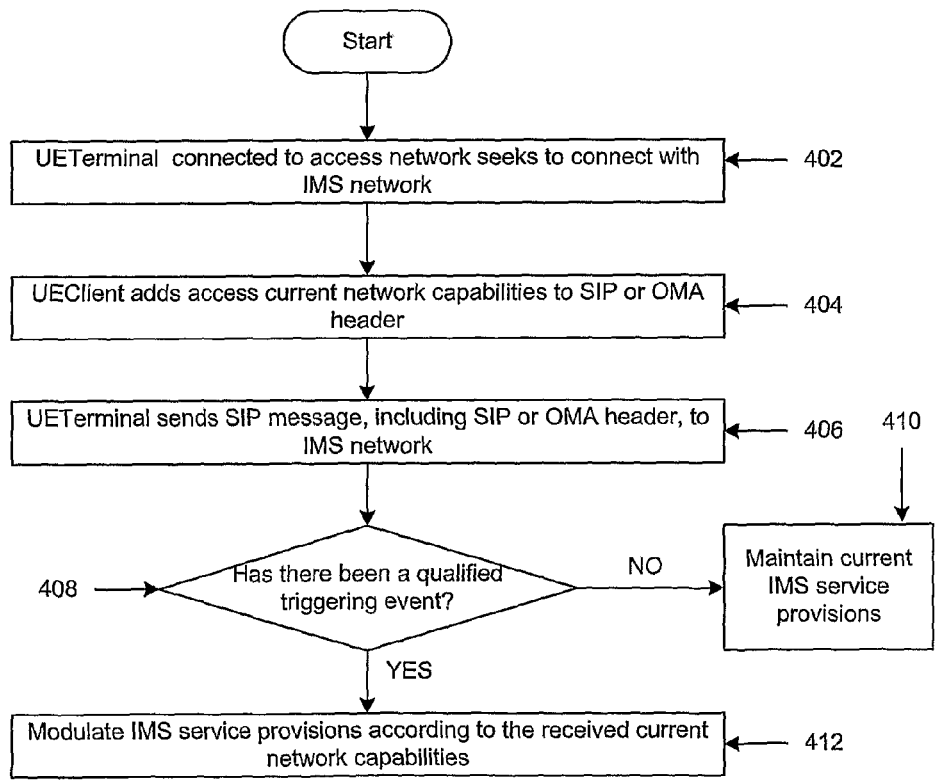
FIG. 4 illustrates a method for notifying an IMS of access network information in accordance with an embodiment of the present invention.

FIG. 4 illustrates a high-level flow diagram of a method for notifying an IMS of access network information in accordance with an embodiment of the present invention. The method description should be viewed in conjunction with FIG. 2. The process begins at step 402 with a caller's phone that is connected to an access network, seeking to connect to an IMS network. The caller's phone sends a SIP or OMA message (e.g., a REGISTER message though there are other messages which can accomplish the same task) to the IMS network. Upon receiving an ACK message from the IMS network, the process moves to step 404 where UEclient 202 incorporates one or more current access network capabilities extensions into a SIP header which is then inserted into a SIP message. In step UEterminal 204 sends the SIP message, including the modified SIP header, to the IMS network. The process then moves to step 408 which determines whether a qualifying trigger event has occurred (change in QoS, for instance). If not, the process proceeds to step 410 where the IMS maintains the current service provisions. If there has been a qualifying trigger event, the process then moves to step 412, where the IMS network modifies the service provisions according to the received current access network capabilities.

The IMS network is designed to work independent of the IP access network on which its clients operate. However, in many cases IMS services are affected by delays, interruptions and available bandwidth in the access network. The above embodiments identify some information that the access network can provide to the IMS network, and the criteria to make provision of this data to the IMS network efficient. This information can be used by the IMS network to provide smart services that recognize the capabilities of the access.

Abbreviations used in the Specification:

| | |
|---|---|
| GGSNGateway | GPRS Support Node |
| IMS | IP Multimedia System |
| OMA | Open Mobile Alliance |
| PANI | P-Access Network Information |
| P-CSCF | Proxy-Call Session Control Function |
| QoS | Quality of Service |
| RTT | Round Trip Delay |
| S-CSCF | Serving-Call Session Control Function |

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

What is claimed:

1. A method of providing an update on access network capability to an IP Multimedia System (IMS) network, the method comprising the steps of:
  a User Equipment (UE) connected to the access network, sending a Session Initiation Protocol (SIP) registration request to the IMS network, wherein the SIP registration request includes a P-Access-Network-Info header having a tag providing current information, including current round trip time in the access network, regarding a capability of the access network; and
  responsive to a triggering event, wherein said triggering event comprises one or more values including, a predetermined threshold value for the degree of change in measured average bandwidth within the access network or between the access and IMS networks, the IMS network modulating service provisions according to the information regarding the capability of the access network available in the tag.

2. The method of claim 1, wherein capabilities of the access network are specified per access capability, or globally, across all capabilities in the access network.

3. The method of claim 1, wherein the tag provides current information on one or more of the access network capabilities, including:
  bandwidth;
  recorded latency over the access network; and
  an interruption in data flow towards the IMS network.

4. The method of claim 1, wherein the triggering event is a predetermined threshold measured in percentage of change of the level of a Quality of Service (QoS) within the access network and between the access and IMS networks.

5. The method of claim 4, wherein a QoS triggering event causes an access capability update if averaging the QoS over time indicates that the access capability has changed.

6. The method of claim 1, wherein the triggering event comprises an interruption event, the interruption event including one of a temporary interruption in the UE access network service, movement of the UE between cells in the access network causing a signal change, and any interruption prior to the UE joining the IMS network.

7. The method of claim 1, wherein the threshold value for the degree of change is determined as the change is averaged over an operator specified period of time.

8. The method of claim 1, wherein the predetermined threshold value is determined as a percentage of change in bandwidth.

9. The method of claim 1, further comprising:
  responsive to a change in access network QoS for the UE, the UE updating the IMS network with the changed access network capability.

10. The method of claim 2, wherein the information provided by the tag is one of:

bandwidth = <data rate in bits/second>;
  latency is accessrtt = <average RTT in milliseconds>; and
  interruption = <interruption in milliseconds>.

11. A system for providing an update on access network capability to an IP Multimedia System (IMS) network, the system comprising:

a User Equipment (UE) connected to the access network having a UE, client utilizing logic for sending a Session Initiation Protocol (SIP) registration request to the IMS network via a UE terminal, wherein the SIP registration request includes a P-Access-Network-Info header having a tag inserted by the UE client providing current information, including current roundtrip time in the access network, regarding a capability of the access network;

a Proxy-CSCF for receiving the SIP registration request and an Application Server (AS), responsive to a triggering event said triggering event comprising one or more values including, a predetermined threshold value for the degree of change in measured average bandwidth within the access network or between the access and IMS networks for modulating service provisions according to the information regarding the capability of the access network available in the tag.

12. The system of claim 11, wherein capabilities of the access network are specified per access capability, or globally, across all capabilities in the access network.

13. The system of claim 11, wherein the tag provides current information on one or more of the access network capabilities, including:
bandwidth;
recorded latency over the access network; and
an interruption in data flow towards the IMS network.

14. The system of claim 11, wherein the triggering event is a predetermined threshold measured in percentage of change of the level of a Quality of Service (QoS) within the access network and between the access and IMS networks.

15. The system of claim 12, wherein the QoS triggering event causes an access capability update only if averaging the QoS over time indicates that the access capability has changed.

16. The system of claim 11, wherein the triggering event comprises an interruption event, the interruption event including one of a temporary interruption in the UE access network service, movement of the UE between cells in the access network causing a signal change, and any interruption prior to the UE joining the IMS network.

17. The method of claim 11, wherein the triggering event triggers the service modulation of the IMS network when the change is averaged over an operator specified period of time.

18. The system of claim 14, wherein the predetermined threshold value is determined as a percentage of change in bandwidth.

19. The system of claim 11, further comprising:
means for updating the IMS network with the changed access network capability in response to a change in access network QoS for the UE.

20. The system of claim 11, wherein the information provided by the tag is one of:
bandwidth=<data rate in bits/second>;
latency is accessrtt=<average RTT in milliseconds>; and
interruption=<interruption in milliseconds>.

21. The method of claim 1, wherein the step of sending a Session Initiation Protocol (SIP) registration request to the IMS network is automatically sent upon a specified change in a current performance capability of the access network.

22. The system of claim 11, wherein the SIP registration request is automatically sent upon a specified change in a current performance capability of the access network.

* * * * *

UNITED STATES PATENT AND TRADEMARK OFFICE
CERTIFICATE OF CORRECTION

PATENT NO.      : 8,477,636 B2                                                    Page 1 of 1
APPLICATION NO. : 12/375286
DATED           : July 2, 2013
INVENTOR(S)     : Talagery It is certified that error appears in the above-identified patent and that said Letters Patent is hereby corrected as shown below:

On Title Page 2, Item (56), under "OTHER PUBLICATIONS", in Column 1,
Line 8, delete "Itnernet" and insert -- Internet --, therefor.

In the Drawings

In Fig. 3e, Sheet 5 of 5, delete Tag "310" and insert Tag -- 312 --, therefor.

In the Specification

In Column 2, Line 22, delete "providing-updates" and insert -- providing updates --, therefor.

In Column 2, Line 63, delete "DRAWING" and insert -- DRAWINGS --, therefor.

In Column 7, Line 33, delete "step" and insert -- step 406 --, therefor.

In the Claims

In Column 10, Line 11, in Claim 17, delete "method" and insert -- system --, therefor.

Signed and Sealed this
Eighth Day of July, 2014

Michelle K. Lee
*Deputy Director of the United States Patent and Trademark Office*